US006256442B1

(12) United States Patent
Nolan et al.

(10) Patent No.: US 6,256,442 B1
(45) Date of Patent: Jul. 3, 2001

(54) ATHERMAL INTEGRATED OPTICAL WAVEGUIDE DEVICE

(75) Inventors: Daniel A. Nolan, Corning, NY (US); Denis M. Trouchet, Sous Senart (FR); David L. Weidman, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/392,000

(22) Filed: Sep. 8, 1999

(51) Int. Cl.[7] ............................................ G02B 6/10
(52) U.S. Cl. ................................ 385/129; 385/130
(58) Field of Search .............................. 385/33, 34, 35, 385/36, 37, 38, 39, 129, 130, 132

(56) References Cited

U.S. PATENT DOCUMENTS 4,781,424 * 11/1988 Kawachi et al. .................... 385/132
6,118,909 * 9/2000 Chen et al. .......................... 385/129

FOREIGN PATENT DOCUMENTS

0849231 * 6/1998 (EP).

* cited by examiner

Primary Examiner—Cassandra Spyrou
Assistant Examiner—Euncha Cherry
(74) Attorney, Agent, or Firm—Philip G. Alden (57) ABSTRACT

An athermalized integrated optical waveguide device in which thermal spectral shifts are inhibited is provided and in which the light transmitting properties are insensitive to temperature variations and fluctuations. The athermnalized integrated optical waveguide device has at least two waveguide core arms, preferably comprised of a silica glass, with the core arms cladded with a waveguide cladding composition, preferably a silica glass that has a boron concentration different than the cores. The first waveguide arm and the second waveguide arm have a difference in an effective index thermal slope in order to provide an athermalized device such as an intereferometer on a substantially planar substrate. In addition the at least two waveguide core arms are comprised of path segments having different waveguide core dimensions.

9 Claims, 5 Drawing Sheets

ATHERMAL INTEGRATED OPTICAL WAVEGUIDE DEVICE

BACKGROUND OF THE INVENTION

1. Field of the Invention

This invention relates to an integrated optical waveguide device in which thermal spectral shifts are inhibited, and particularly to athermalized optical waveguide devices in which the light transmitting properties are insensitive to temperature variations and fluctuations.

2. Technical Background

Integrated optical waveguide devices, such as integrated optical circuits, combine miniaturized waveguides and optical devices into a functional optical system incorporated onto a small planar substrate. Such integrated optical waveguide devices are utilized in optical communications systems, usually by attaching optical waveguide fibers, that transmit light signals, to the integrated optical waveguide device as inputs and outputs. The integrated optical waveguide device performs a function or process on the transmitted light in the optical communications system. Such devices provide good performance at consistent standard room temperatures but exhibit thermal spectral shifts ($d\lambda/dT$, measured in nm/° C.) and related poor performance when used in environments where they are exposed to thermal variations and fluctuations in temperature. Integrated optical devices which incorporate interferometers, particularly interferometers based on the division of amplitude, such as Mach-Zehnder interferometers which depend on amplitude splitting of a wavefront, can be used as transmitting filters, sensors, and wavelength multiplexing and demultiplexing devices.

Integrated optical devices which incorporate an interferometer are particularly useful as a wavelength division multiplexer/demultiplexer. Such wavelength multiplexer/demultiplexers may incorporate a phased array comprised of a plurality of different waveguide core arms.

It has been found that the use of integrated optical waveguide devices is limited by their temperature dependence. In such integrated devices, thermal spectral shifts of greater than or of the order of about 0.001 to 0.01 nm/° C. at a transmitting wavelength of 1550 nm can limit their usefulness in environments of differing temperature.

SUMMARY OF THE INVENTION

Accordingly the present invention is directed to an optical waveguide device that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the compositions, structures, design, and methods particularly pointed out in the written description and claims hereof as well as the appended drawings.

To achieve these and other advantages and in accordance with the purpose of the invention, as embodied and broadly described, the invention provides an athermalized integrated optical waveguide device having at least two waveguide core arms with the core arms cladded with a waveguide cladding composition, preferably a silica glass that has a boron concentration different than the cores. Preferably the at least two waveguide core arms are of the same core composition, preferably a silica glass.

In another aspect, the invention includes an athermal optical waveguide device having at least two waveguide core arms which are comprised of path segments having different waveguide core dimensions.

A further aspect of the invention is to provide a method of athermnnalizing an optical waveguide device by forming at least two waveguide core arms having path segments of unequal waveguide core widths and cladding the waveguide core arms with a cladding composition having a concentration of boron different than the waveguide core arms.

It is to be understood that both the foregoing general description, and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and, together with the description, serve to explain the principles of the invention.

DETAILED DESCRIPTION OF THE PREFERRED EMBODIMENTS

The athermalized integrated optical waveguide device of the invention includes a first waveguide core arm and at least a second waveguide core arm, and a waveguide cladding which clads the waveguide core arms.

The athermalized waveguide device comprises a first waveguide core arm, a second waveguide core arm, wherein the first and second waveguide core arms are comprised of a core composition, a waveguide cladding, said waveguide cladding cladding said waveguide core arms, said waveguide cladding comprised of a cladding composition, wherein said core composition and said cladding composition have a difference in thermal spectral index shift slope (nm/° C.). The difference in thermal spectral index shift slope (nm/° C.) is preferably negative but may be positive. Preferably the core composition comprises a silica glass core composition. Preferably the cladding composition comprises a silica glass cladding composition. Said silica glass core composition and said silica glass cladding composition preferably have a difference in concentration of a dopant for controlling thermal spectral index shift slope (nm/° C.), wherein said two waveguide arms have a difference in effective index thermal slope $d(N_1-N_2)/dT$, where $N_1$ and $N_2$ are the effective indices of the fundamental modes of the first and second waveguides, preferably wherein said difference in concentration of dopant for controlling thermal spectral index shift slope (nm/° C.) is a difference in boron concentration.

The cladding composition and the core composition have different material based physical properties such as the thermal variation of the index of refraction (dn/dT) and thermal expansion ( =(1/L)(dL/dT)). For example adding $B_2O_3$ to the silica glass compositions reduces the thermal variation of the index of refraction (dn/dT). The material based physical properties differences between the cladding composition and the core composition, in conjunction with waveguide effects, such as width differences, combine to change the thermal spectral shifts of the waveguide device (dλ/dT, measured in nm/° C.).

Preferably the first waveguide core arm is comprised of a path segment having a waveguide core dimension of $w_1$ and said second waveguide core arm is comprised of a path segment having a waveguide core dimension of $w_2$ wherein $w_1$ is not equal to $w_2$, preferably said waveguide core dimension of $w_1$ and said waveguide core dimension of $w_2$ are waveguide core width, and less preferably are waveguide core thickness.

In addition, the first waveguide core arm may be comprised of a path segment having a waveguide core dimension of $w_1$ and a path segment having a waveguide core dimension of $w_2$, and said second waveguide core arm may be comprised of a path segment having a waveguide core dimension of $w_1$ and a path segment having a waveguide core dimension of $w_2$, wherein the length of said first waveguide core arm path segment having a waveguide core dimension of $w_1$ is not equal to the length of said second waveguide core arm path segment having a waveguide core dimension of $w_1$, preferably wherein the length of said first waveguide core arm path segment having a waveguide core dimension of $w_2$ is not equal to the length of said second waveguide core arm path segment having a waveguide core dimension of $w_2$.

The optical waveguide device may include a planar substrate and may comprise an interferometer, a filter, a wavelength division multiplexer/demultiplexer, or a phased array.

Reference will now be made in detail to the present preferred embodiments of the invention, an example of which is illustrated in accompanying drawing FIG. 1.

Figure 1:
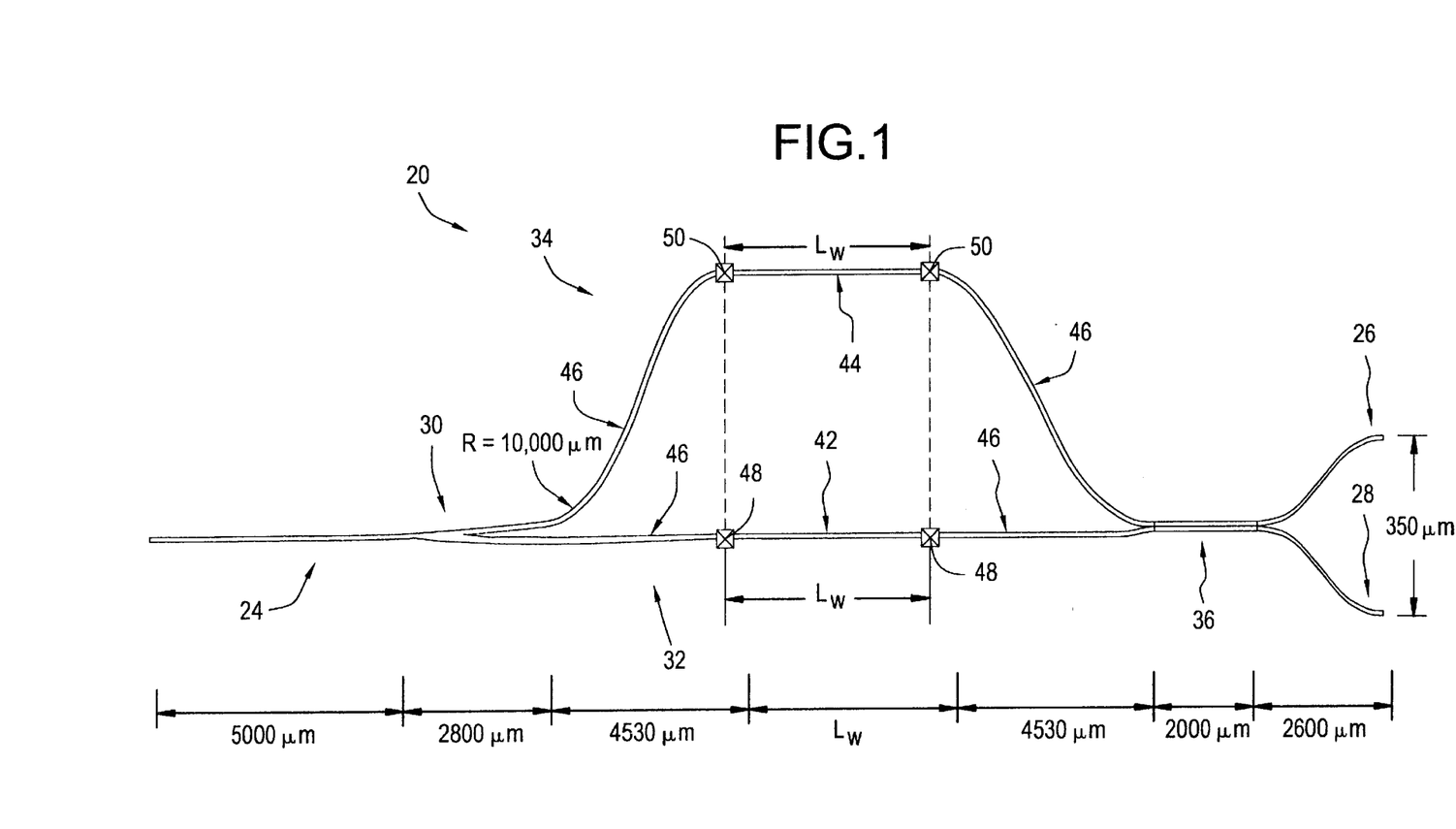
FIG. 1 comprises a schematic representation of an inventive integrated Mach-Zehnder interferometer optical waveguide device.

The exemplary embodiment of the inventive waveguide device of the present invention is shown in FIG. 1 and is designated generally by reference numeral 20.

Figure 2:
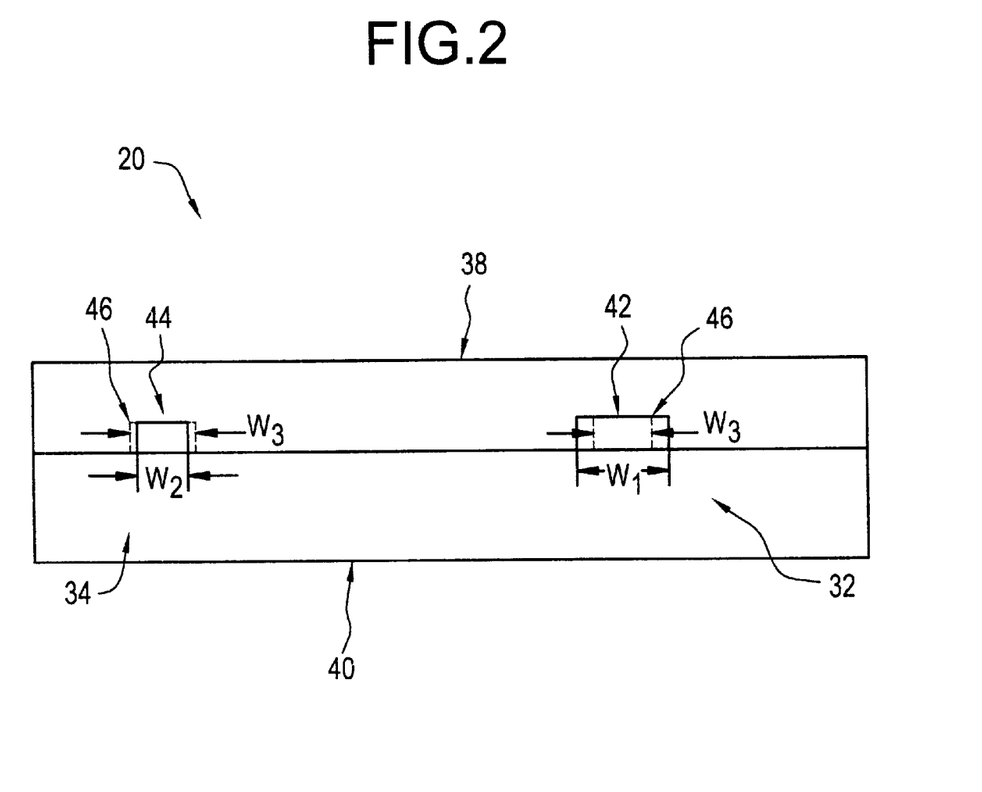
FIG. 2 comprises a cross-section view of the inventive integrated Mach-Zehnder interferometer optical waveguide device showing channel waveguide widths.

In FIG. 1 athermalized integrated optical waveguide device 20 includes a first waveguide core arm 32 and a second waveguide core arm 34. First and second waveguide core arms 32 and 34 are comprised of a silica glass core composition. As shown in FIG. 2, first and second waveguide core arms 32 and 34 are cladded with a waveguide cladding 38 comprised of a silica glass cladding composition. The silica glass core composition of first and second waveguide core arms 32 and 34 and the silica glass cladding composition of waveguide cladding 38 have a difference in boron concentration. The cladding composition and the core compositions have different boron concentrations, one of which may be zero. Boron is a silica glass index depressing dopant which reduces the thermal variation of the index of refraction. Boron is a dopant which provides for controlling the thermal spectral index shift slope (nm/° C.), wherein the difference in boron concentration is a difference in concentration of dopant for controlling thermal spectral index shift slope (nm/° C.).

First waveguide core arm 32 is comprised of a path segment 42 having a waveguide core dimension of $w_1$. Second waveguide core arm 34 is comprised of a path segment 44 having a waveguide core dimension of $w_2$.

As shown in FIG. 2, in the preferred embodiment, dimensions $w_1$ and $w_2$ are waveguide core widths. The first waveguide core arm 32 of optical waveguide device 20 is comprised of a path segment 42 having a waveguide core width dimension of $w_1$. The second waveguide core arm 34 is comprised of a path segment 44 having a waveguide core width dimensions of $w_2$, wherein the widths $w_1$ and $w_2$ are not equal, and are substantially different.

Figure 3:
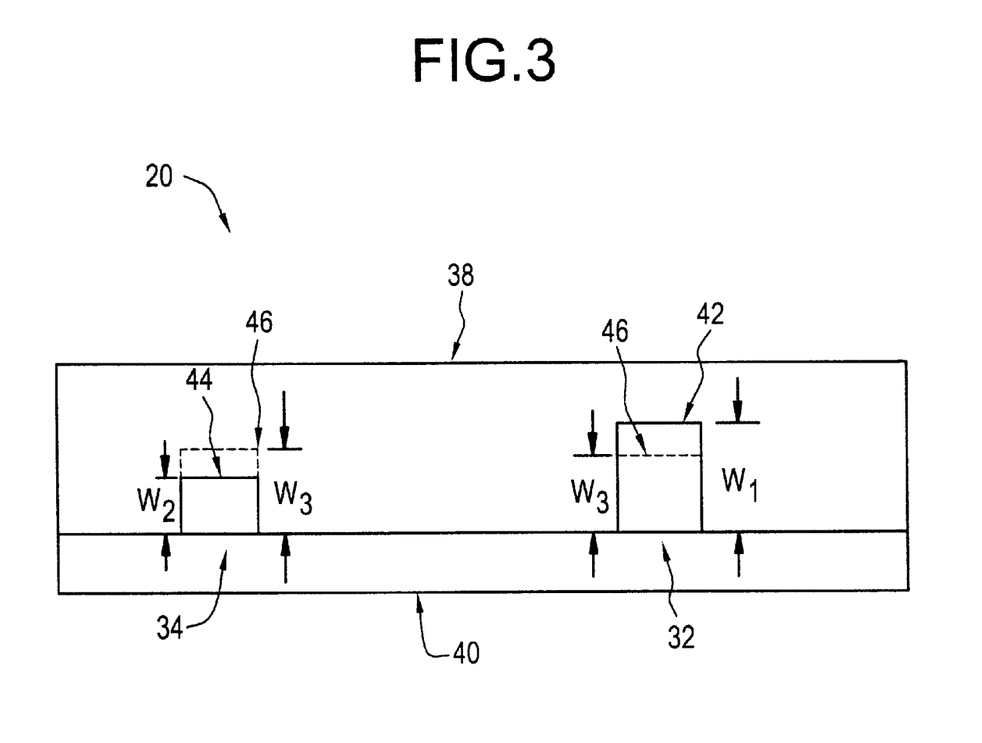
FIG. 3 comprises a cross-section view of the inventive integrated Mach-Zehnder interferometer optical waveguide device showing channel waveguide thickness.

As shown in FIG. 3, first waveguide core arm 32 is comprised of a path segment 42 which may have a waveguide core thickness dimension of $w_1$. Second waveguide core arm 34 comprised of path segment 44 may have a waveguide core thickness dimension of $w_2$. First waveguide core arm path segment 42 may have a waveguide core thickness and width dimensions different from second waveguide core arm path segment 44.

The silica glass core composition of the invention is preferably comprised of $GeO_2$, $B_2O_3$, $P_2O_5$, and $SiO_2$. More preferably, the silica glass core composition comprises 10–20 wt. % $GeO_2$, 0–2 wt. % $B_2O_3$, 0–2 wt. % $P_2O_5$, and 60–90 wt. % $SiO_2$. Most preferably the silica glass core composition comprises about 15 wt. % $GeO_2$, about 1 wt. % $B_2O_3$, about 1 wt. % $P_2O_5$, and about 83 wt. % $SiO_2$.

The silica glass cladding composition of the invention is preferably comprised of $B_2O_3$, $P_2O_5$, and $SiO_2$. More preferably the silica glass cladding composition comprises 3–13 wt. % $B_2O_3$, 0–5 wt. % $P_2O_5$, and 75–97 wt. % $SiO_2$. Most preferably the silica glass cladding composition comprises about 8 wt. % $B_2O_3$, about 2 wt. % $P_2O_5$, and about 90 wt. % $SiO_2$.

The silica glass core composition and the silica glass cladding composition preferably have a boron concentration difference in the range of about 3 wt. % $B_2O_3$ to about 11 wt. % $B_2O_3$. This boron concentration difference between the core and the cladding is more preferably in the range of about 5 wt. % $B_2O_3$ to about 9 wt. % $B_2O_3$, even more preferred in the range of about 6 wt. % $B_2O_3$ to about 8 wt. % $B_2O_3$, and most preferably about 7 wt. % $B_2O_3$.

Preferably, the first and second waveguide arms 32 and 34 are comprised of the same silica glass core composition with said first and second waveguide arms glass core compositions being formed concurrently from the same glass forming source, preferably as a uniform glass layer of homogeneous composition formed from a commonly mixed silica core glass feedstock which is converted preferably through oxidation into the glass.

Preferably, waveguide cladding 38 overlays first and second waveguide core arms 32 and 34 as a overclad layer of uniform composition formed from a commonly mixed silica cladding glass feedstock which is converted preferably through oxidation into the glass.

Preferably the silica glass core composition is formed by flame hydrolysis conversion of a commonly mixed silica core glass feedstock comprised of halide-free organometallic source compounds. Preferably the silica glass cladding composition is formed by the flame hydrolysis conversion of a commonly mixed silica cladding glass feedstock comprised of halide-free organometallic source compounds. Preferably the source compound for $SiO_2$ is octamethylcyclotetrasiloxane, for $GeO_2$ is germanium ethoxide, for $B_2O_3$ is triethylborate, and for $P_2O_5$ is trimethylphosphate.

Optical waveguide device 20 comprises a silica glass substrate 40, which provides a base for the formation of the device waveguides such as first and second waveguide core arms 32 and 34. Substrate 40 may comprise a silicon substrate having a buffer layer.

As shown in FIG. 1, preferably first waveguide core arm path segment 42 having the waveguide core width $w_1$ is substantially parallel with the second waveguide core arm path segment 44 having the waveguide core width $w_2$.

In the Mach-Zehnder interferometer optical waveguide device 20, the optical path length of first waveguide core arm 32 is not equal to the optical path length of second waveguide core arm 34. The physical path length of first waveguide core arm 32 is not equal to the physical path length of second waveguide core arm 34 as measured from Y coupler 30 to proximity coupler 36. In an alternative embodiment a balanced Mach-Zehnder interferometer can be utilized where both arms are of equal physical length, but have unequal optical path length. In Mach-Zehnder interferometer optical waveguide device 20, first waveguide core arm 32 is comprised of path segments 46 having a waveguide core width of $w_3$. First waveguide core arm 32 includes adiabatic tapers 48 between path segments 46 and path segment 42. Adiabatic tapers 48 connect the $w_3$ core width of path segment 46 with the $w_1$ core width of path segment 42. Second waveguide core arm 34 includes adiabatic tapers 50 between path segments 46 and path segment 44. Adiabatic tapers 50 connect the $w_3$ core width of path segment 46 with the $w_2$ core width of path segment 44. The length of first waveguide core arm path segment 42 having the $w_1$ waveguide core width is substantially equal to the length of second waveguide core arm path segment 44 having the $w_2$ waveguide core width.

The invention further includes an integrated optical waveguide device 20, preferably an athermalized Mach-Zehnder interferometer, comprised of at least two unequal optical path length waveguide paths 32 and 34 of the same core glass composition comprised of $GeO_2$, $B_2O_3$ $P_2O_5$, and $SiO_2$, which are cladded with a clad glass composition comprised of $B_2O_3$ $P_2O_5$, and $SiO_2$, having a $B_2O_3$ concentration different than the core glass composition, wherein the at least two unequal length paths 32 and 34 include respectively path segments 42 and 44 of different path segment widths. The difference of widths between the path segments 42 of path 32 and 44 of path 34 provide a means for varying the fraction of the mode field propagated in the waveguide paths. Preferably the path segments 42 and 44 of different widths have the same length.

The invention further includes an integrated optical waveguide interferometer comprising: a first channel waveguide arm and a second channel waveguide arm, said channel waveguide arms having a difference in length of $\Delta L$, said channel waveguide arms comprised of a core composition, said first channel waveguide arm including a segment of length $L_w$ having a channel waveguide width $w_1$ and a mode field effective index $N_1$ dependent on the channel waveguide width $w_1$, said first channel waveguide arm including a segment having a channel waveguide width $w_3$ and a mode field effective index $N_3$ dependent on the channel waveguide width $w_3$, said second channel waveguide arm including a segment of length $L_w$ having a channel waveguide width $w_2$ and a mode field effective index $N_2$ dependent on the channel waveguide width $w_2$, said second channel waveguide arm including a segment having a channel waveguide width $w_3$ and a mode field effective index $N_3$ dependent on the channel waveguide width $w_3$, a waveguide cladding composition, said waveguide cladding composition cladding said channel waveguide arms, said cladding composition having a concentration of a dopant for controlling thermal spectral index shift slope (nm/° C.), wherein $\Delta B$ is the difference between the concentration of the dopant in the core composition and the cladding composition, said integrated optical waveguide interferometer being substantially insensitive to a temperature T change when $$\frac{dN_3}{dT}\Delta L + \frac{d(N_2 - N_1)}{dT}L_w \cong 0,$$

preferably wherein said dopant for controlling thermal spectral index shift slope (nm/° C.) comprises boron.

The method of making the optical waveguide devices of the invention includes the method of athermalizing the optical waveguide devices to inhibit thermal spectral shifts. The inventive method of making an optical waveguide device includes the step of providing a first waveguide arm 32 and a second waveguide arm 34, with the waveguide arms having a difference in length of $-L$; the waveguide arms comprised of a core composition having a high index of refraction, the first waveguide arm including a segment 42 of length $L_w$ having a waveguide width $w_1$, the remainder of said first waveguide arm having a waveguide width $w_3$, the second waveguide arm 34 including a segment 44 of length $L_w$ having a waveguide width $w_2$, and the remainder of said second waveguide arm having a waveguide width $w_3$. The inventive method includes the step of cladding the waveguide arms with a cladding composition having a low index of refraction, said cladding composition having a boron concentration different from the boron concentration of the core composition, wherein $-B$ is the difference between the boron concentration of the core composition and the cladding composition. The method further includes the step of athermalizing the optical waveguide device by optimizing $-L$, $L_w$, $w_1$, $w_2$, w3, and $-B$ to provide a zero or near zero thermal spectral shift when subjected to a change in temperature T. The segment 42 of length $L_w$ having a waveguide width $w_1$ has a mode field effective index $N_1$ dependent on the width $w_1$. The segment 44 of length $L_w$ having a waveguide width $w_2$ has a mode field effective index $N_2$ dependent on the width $w_2$. The remainder of the first and second waveguide arms 32 and 34 have a waveguide width of $w_3$ with a mode field effective index $N_3$. The method of making the optical waveguide device includes the step of athermalizing the device by providing $N_3$, $-L$, $N_2$, $N_1$, and $L_w$ according to the equation:

$$\frac{dN_3}{dT}\Delta L + \frac{d(N_2 - N_1)}{dT}L_w \cong 0$$

The invention further includes a method of making an optical waveguide device 20 preferably a Mach-Zehnder interferometer embodied in an integrated optical circuit, having the step of providing an optical waveguide device substrate 40. Preferably the optical waveguide device substrate is comprised of silica glass, most preferably fused silica. The method further includes the step of forming a first waveguide core arm 32 of a silica glass core composition of high refractive index, first waveguide core arm 32 including a path segment 42 having a waveguide core width of $w_1$ and a path segment 46 having a waveguide core width of $w_3$, first waveguide core arm 32 having a length of $L_1$. The method includes the step of forming a second waveguide core arm 34 of said silica glass core composition, second waveguide core arm 34 including a path segment 44 having a waveguide core width of $w_2$ and a path segment 46 having a waveguide core width of $w_3$, second waveguide core arm 34 having a length $L_2$ not equal to the length $L_1$ of first waveguide core arm 32. The method further includes the step of cladding first and second waveguide core arms 32 and 34 with a silica glass cladding composition of low refractive index. The method includes providing the silica glass core composition with a boron concentration $B_{core}$. The method further includes the step of providing the silica glass cladding composition with a boron concentration $B_{clad}$ different from the silica glass core composition boron concentration $B_{core}$.

Preferably the step of forming first waveguide core arm 32 and second waveguide core arm 34 includes the step of depositing a core layer of the silica glass core composition over the silica glass substrate and the step of exposing the deposited core layer with an image containing a pattern of first waveguide core arm 32 and second waveguide core arm 34. Preferably this method utilizes photolithography techniques in which a mask containing the planar pattern of the waveguide arms and optical circuitry of optical waveguide device 20 including the appropriate size, orientation, placement, and shape of elements such as couplers 30 and 36, waveguide segments 46, 44, 42, adiabatic tapers 48 and 50, input waveguide 24, and output waveguides 26 and 28 is used with light to expose an image of the pattern on the core composition. Such light exposure effects a chemical change in the exposed areas compared to the unexposed areas. Chemical processing techniques such as etching, preferably reactive ion etching, are used to remove the exposed or unexposed areas to result in waveguide arms 32 and 34 and the other elements of optical waveguide device 20 and its optical circuitry. Exposure and removal techniques can be utilized to adjust the depth of formed waveguides and elements. Exposure and removal techniques can also be utilized to adjust the resolution, width, and other dimensions of the pattern image and the formed waveguides and elements. Such exposure, chemical processing, and removal techniques can be utilized to change and adjust the optical properties and characteristics of the wavguides, such as to change or adjust the optical path lengths of the waveguides.

Preferably the method step of forming first waveguide core arm 32 and second waveguide core arm 34 includes the step of forming first waveguide core arm path segments 42 having a waveguide core width of $w_1$ substantially parallel to second waveguide core arm path segment 44 having a waveguide core width of $w_2$. Preferably the method further includes forming first waveguide core arm path segment 42 having a waveguide core width of $w_1$ with a length of $L_w$ and second waveguide core arm path segment 44 having a waveguide core width of $w_2$ with a substantially equal length of $L_w$. Preferably the method includes the step of optimizing $w_3$, $L_1$, $L_2$, $w_1$, $w_2$, $L_w$, and the difference between $B_{core}$ and $B_{clad}$ to provide an athermal optical waveguide device having a minimal or no dependence on temperature T, more preferably an athermal amplitude interferometer, and most preferably a Mach-Zehnder interferometer.

An athermal Mach-Zehnder interferometer optical waveguide device 20 may be produced, utilizing straight waveguide path segments 42 and 44 having the same length $L_w$ and different widths, $w_1$ and $w_2$, to vary the fraction of the mode field which is propagated within the core and clad layer compositions which have different boron concentrations, resulting in minimal temperature dependence.

In athermalized optical waveguide device 20, the same silica glass core composition is used for each of the interferometer arms 32 and 34. Also, the same silica glass cladding composition is used to clad arms 32 and 34 with cladding 38. Straight waveguide path segment 42 having a waveguide core width of $w_1$, of first waveguide core arm 32 and straight waveguide path segment 44 having a waveguide core width of $w_2$ of second waveguide core arm 34, have the same length $L_w$, so that the path length difference –L between first waveguide core arm 32 and second waveguide core arm 34 is not changed but their different widths $w_1$ and $w_2$ vary the fraction of the mode field which is propagated within the core and clad layers which have a boron concentration difference –B. The preferred boron concentration $B_{core}$ of the silica glass core composition which comprises the core is 1 wt. % boron ($B_2O_3$). The preferred boron concentration $B_{clad}$ of the silica glass cladding is 8 wt. % boron ($B_2O_3$). This provides an appropriate and preferred -B of about $\Delta B = B - B_{clad} = -7$ wt. % boron ($B_2O_3$). Path segment 42 of waveguide core width $w_1$ and path segment 44 of waveguide core width $w_2$ are utilized in the invention without additional loss by providing adiabatic tapers 48 and 50 between the path segments of different width to couple these waveguides of different widths. Path segment 42 may have an enlarged width $w_1$ which may be multimode but this does not impact the response of the device because only the fundamental mode is excited and any residual light coupled to higher order modes is eliminated by waveguides 46 located after path segment 42. The length of waveguides 46 after path segments 42 and 44 may be increased as needed to obtain the filtering effect while not changing –L.

Mach-Zehnder interferometer optical waveguide device 20 when made with the athermalization condition of:

$$\frac{dN_3}{dT}\Delta L + \frac{d(N_2 - N_1)}{dT}L_w = 0;$$

provides an athermalized optical waveguide device 20.

Optical waveguide device 20 functions as a Mach-Zehnder interferometer when the Optical Path Difference (OPD) and constructive interference conditions are met according to the following equation:

$$OPD = (N_3)(\Delta L) + (N_2 - N_1)(L_w) = m\lambda;$$

wherein $N_3$ is the mode effective index associated to the waveguide width $w_3$ of waveguide arm path segments 46, $N_1$ is the mode effective index associated to the waveguide width $w_1$ of first waveguide arm path segment 42, $N_2$ is the mode effective index associated to the waveguide width $w_2$ of second waveguide path segment 44, –L is the path length difference between first waveguide core arm 32 and second waveguide core arm 34 $L_w$, the length of path segments 42, 44, m is an integer number, and $\Sigma$ is the wavelength of light transmitted through optical waveguide device 20.

The thermal spectral shift of the optical waveguide device is the wavelength shift as a function of temperature (T) and is derived as:

$$m\frac{d\lambda}{dT} = \frac{dN_3}{dT}\Delta L + \frac{d(N_2 - N_1)}{dT}L_w.$$

Athermalization of optical waveguide device 20 can then be achieved when $$\frac{dN_3}{dT}\Delta L + \frac{d(N_2 - N_1)}{dT}L_w = O.$$

This assumes that the contributions to thermal change in optical path length due to length changes are negligibly small compared to the contribution due to index of refraction changes, which is found in high silica glass compositions.

Even though the three coefficients $$\frac{dN_3}{dT}, \frac{dN_1}{dT}, \text{ and } \frac{dN_2}{dT}$$

and are positive, athermalization can be achieved by having the difference in effective index thermal slope, $$\frac{d(N_2-N_1)}{dT},$$

negative and properly adjusting the length $L_w$ of path segments 42, 44. The temperature coefficient $$\frac{d(N_2-N_1)}{dT}$$

is related to the widths $w_1$ and $w_2$ and to the temperature coefficient $$\frac{d(N_{core}-N_{clad})}{dT}$$

which is not zero because of the boron concentration difference −B between the core composition (for example $B_{core}$=1 wt. % $B_2O_3$) and the cladding composition (for example $B_{clad}$=8 wt. % $B_2O_3$).

The mode effective index, such as $N_1$, $N_2$ and $N_3$, associated to a waveguide of width w, such as $w_1$, $w_2$ and $w_3$, is a combination of the refractive indexes of the core composition and the cladding composition weighted by the fraction of the mode field that is propagated within each of the layers (core/cladding), and is given by the following:

$$N=[f(w)]N_{core}+[1-f(w)]N_{clad};$$

wherein $f(w)$ is the fraction of the mode field propagated within the core composition material and $1-f(w)$ is the fraction of the mode field propagated within the cladding composition material. Determining $N_1$, $N_2$ and $N_2-N_1$ for waveguide path segment 42 with width $w_1$ and waveguide path segment 44 with width $w_2$ is provided by the following equations:

$$N_1=[f(w_1)]N_{core}+[1-f(w_1)]N_{clad}$$

$$N_2=[f(w_2)]N_{core}+[1-f(w_2)]N_{clad}$$

$$N_2-N_1=[f(w_2)-f(w_1)][N_{core}-N_{clad}]$$

The temperature (T) dependence of the mode effective index difference $N_2-N_1$ is then given by the following:

$$\frac{d(N_2-N_1)}{dT}=[f(w_2)-f(w_1)]\frac{d[N_{core}-N_{clad}]}{dT}.$$

Then using the substitution of:

$$\frac{d[N_{core}-N_{clad}]}{dT}=\frac{d}{dT}\left[\frac{dN}{dB}\Delta B\right]$$

the core and the clad are predominately related to boron concentration and only to a lesser degree effected by variation of $GeO_2$, $P_2O_5$, and $SiO_2$;

wherein −B is the boron concentration change between the core composition and the cladding composition, the athermalization condition is provided by the following:

$$\frac{d(N_2-N_1)}{dT}=[f(w_2)-f(w_1)]\frac{d^2N}{dTdB}\Delta B; \text{ and}$$

$$\frac{dN_3}{dT}\Delta L+\frac{d(N_2-N_1)}{dT}L_w=0$$

The athermalized optical waveguide device 20 of the invention, includes for example, a Mach-Zehnder interferometer with a path length difference −L=80 µm, which provides a wavelength periodicity of about 20 nm between spectral features. The Mach-Zehnder interferometer silica glass core composition is comprised of 15.6 wt. % $GeO_2$, 1.1 wt. % $B_2O_3$, 0.7 wt. % $P_2O_5$, and 82.6 wt. % $SiO_2$, and has an index of refraction of approximately 1.455. The Mach-Zehnder interferometer silica glass cladding composition is comprised of 7.9 wt. % $B_2O_3$, 2.1 wt. % $P_2O_5$, and 90 wt. % $SiO_2$, and has an index of refraction of approximately 1.444. These compositions are deposited on a fused silica substrate using flame hydrolysis deposition. Channel waveguides are patterned and formed using photolithography and reactive ion etching. As shown in FIG. 1, input straight waveguide 24 could have a length of about 5000 µm and a path width $w_3$=6.5 µm, second waveguide core arm 34 having a curvature of radius R=10,000 µm, Y coupler 30 having a length of about 2800 µm, proximity coupler 36 having a length of about 2000 µm and coupler path widths of $w_3$=6.5 µm, output waveguides 26 and 28 having a length of about 2600 µm and widths of $w_3$=6.5 µm and separated at their ends by about 350 µm. This Mach-Zehnder interferometer example has a core-clad-=0.75% and the remainder path segments 46 have $w_3$=6.5 µm. Given a $w_1$=10 µm for path segment 42 and $w_2$=3 µm for path segment 44, the fraction of the mode field which is propagated within the waveguide core is respectively $f(w_1=10 \ \mu m)=0.89$ and $f(w_2=3 \mu m)=0.49$.

The temperature coefficient $d(N_2-N_1)/dT$ is calculated as $$\frac{d(N_2-N_1)}{dT}=-2.1\times 10^{-7}/^\circ C.$$

The temperature coefficient $d(N_2-N_1)/dT$ is calculated from $d^2N/(dTdB)$ which is a factor that is representative of the core and clad materials and can be determined by analysis of the core and clad materials.

Using the index temperature coefficient of silica $dN/dT=10.5\times 10^{-6}/C^\circ$ as an approximate value for the remainder path segments 46 as $$\frac{dN_3}{dT}$$

in the athermal condition of $$\frac{dN_3}{dT}\Delta L+\frac{d(N_2-N_1)}{dT}L_w=O,$$

provides a means to determine the order of magnitude of $L_w$. The actual value of dN/dT will slightly differ from the value for silica because of the other components in the glass composition, but this can be taken into account by minor adjustment of the lengths of path segments 42 and 44. With $\Delta L$=80 µm, and $d(N_2-N_1)/dT=-2.1\times 10^{-7}/^\circ$ C., the athermal condition is met with $L_w$=4000 Tm. With the length of $L_w$ path segments 42, 44 equal to 4000 Tm, the path segments 42 and 44 comprise about 20% of the length of optical waveguide device 20.

Athermalized waveguide device 20 may have more than two waveguide core arms. When athermalized waveguide device 20 comprises a wavelength division multiplexer/demultiplexer, athermalized waveguide device 20 may include a plurality of waveguide core arms. In such a wavelength division multiplexer/demultiplexer the plurality of waveguide core arms are in the form of a phased array, also known as a phasar. In such a multiplexer/demultiplexer the phased array of waveguide core arms may include approximately a hundred waveguide core arms.

Figure 4:
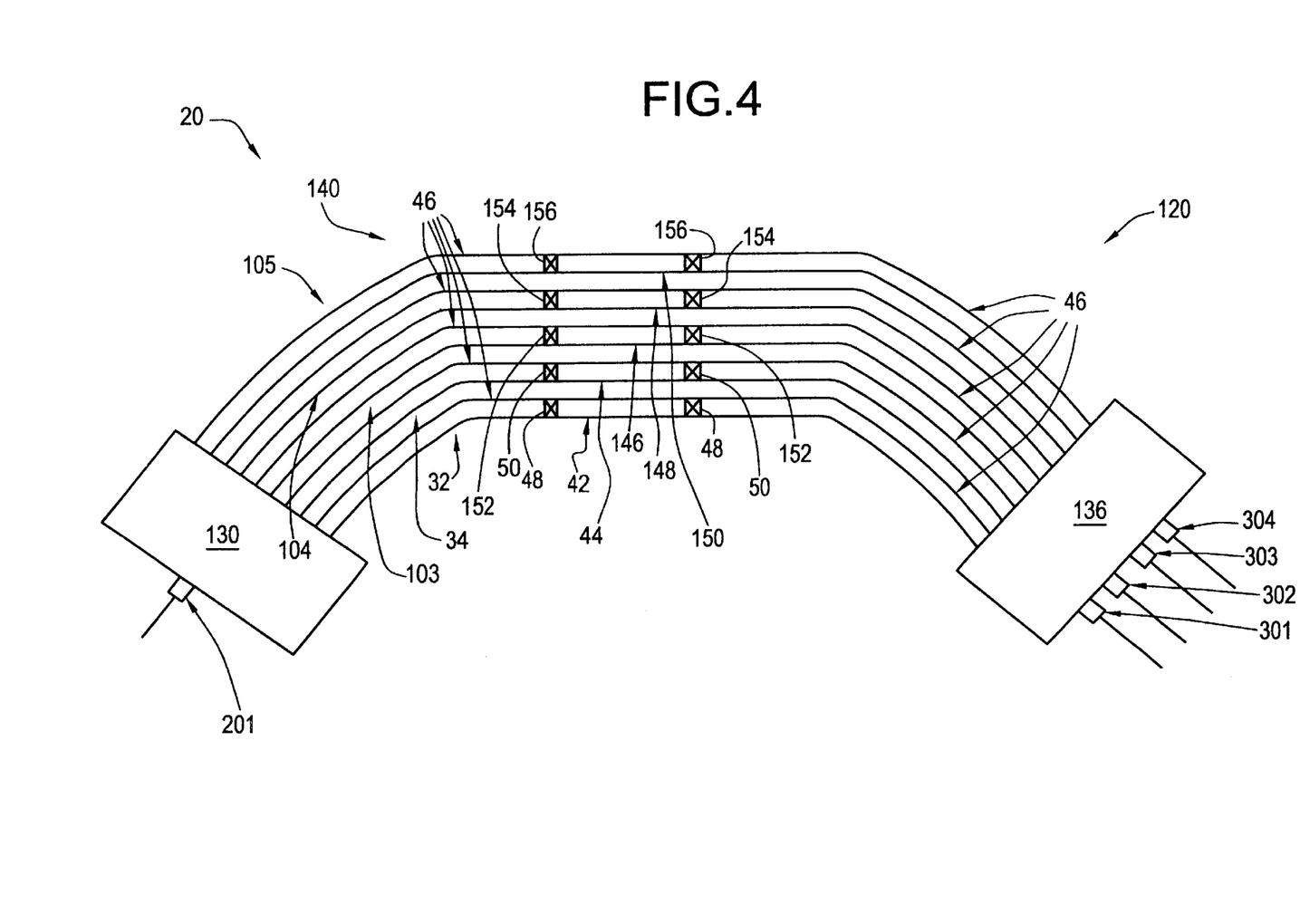
FIG. 4 comprises a schematic representation of an inventive integrated optical multiplexer/demultiplexer waveguide device.

FIG. 4 shows an example of an athermalized waveguide device 20 comprising a multiplexer/demultiplexer 120 which included a phased array 140 of waveguide core arms 32, 34, 103, 104, and 105. For illustrative purposes, FIG. 4 provides an example of such a multiplexer/demultiplexer having only five waveguide core arms, wherein operation such a multiplexer/demultiplexer would include 3 or more waveguide core arms, and usually would include many more waveguide core arms, usually as many as about 100. Multiplexer/demultiplexer 120 as referenced in the direction for demultiplexing, further includes couplers 130 and 136, waveguide input 201, and waveguide outputs 301, 302, 303, and 304. Coupler 130 may couple an optical signal comprised of four wavelength channels from input 201 into waveguide core arms 32, 34, 103, 104, and 105 which function to separate the optical signal into its four wavelength channels which are coupled by coupler 136 into outputs 301, 302, 303, and 304.

In FIG. 4, waveguide core arm 32 is comprised of a path segment 42 having a waveguide core dimension of $w_1$, path segments 46 having a waveguide core dimension $w_3$, and adiabatic tapers 48 between path segments 46 and path segment 42. Waveguide core arm 34 is comprised of a path segment 44 having a waveguide core dimension of $w_2$, path segments 46 having a waveguide core dimension $w_3$, and adiabatic tapers 50 between path segments 46 and path segment 44.

Waveguide core arm 103 is comprised of a path segment 146 having a waveguide core dimension $W_{103}$, path segments 46 having a waveguide core dimension $w_3$, and adiabatic tapers 152 between path segments 46 and path segment 146. Waveguide core arm 104 is comprised of a path segment 148 having a waveguide core dimension $w_{104}$, path segments 46 having a standard waveguide core dimension $w_3$, and adiabatic tapers 154 between path segments 46 and path segment 148. Waveguide core arm 105 is comprised of a path segment 150 having a waveguide core dimension $w_{105}$, path segments 46 having a waveguide core dimension $w_3$, and adiabatic tapers 156 between path segments 46 and path segment 150. First, second, third, fourth, and fifth waveguide core dimensions $w_1$, $w_2$, $w_{103}$, $w_{104}$, and $w_{105}$ are unequal.

Figure 5:
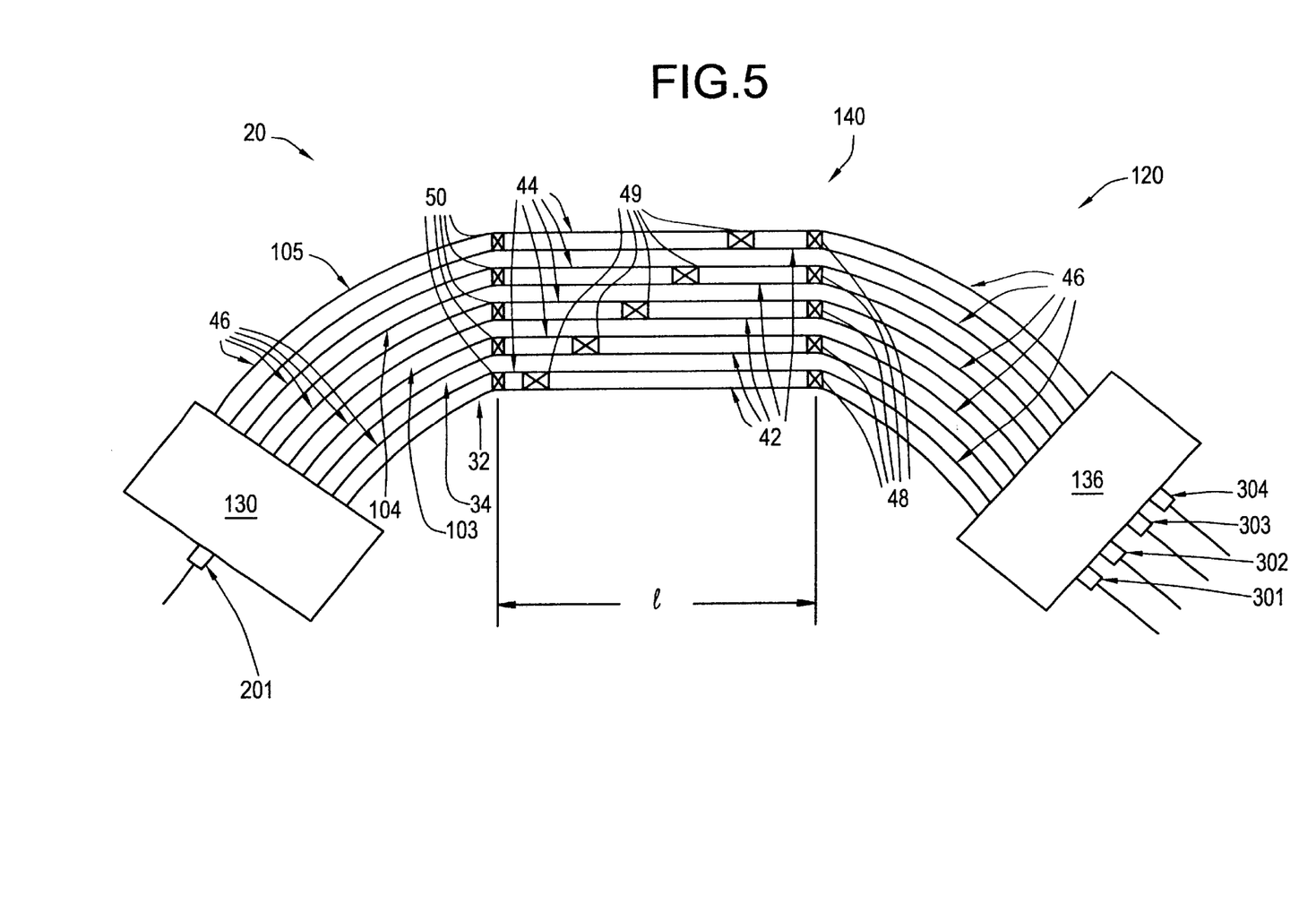
FIG. 5 comprises a schematic representation of an inventive integrated optical multiplexer/demultiplexer waveguide device.

FIG. 5 provides another embodiment of an athermalized waveguide device 20 comprising a multiplexer/demultiplexer 120. The phased array 140 of waveguide core arms 32, 34, 103, 104, and 105 include path segments 42 of varying length having a waveguide core arm dimension $w_1$ and path segments 44 of varying length having a waveguide core arm dimension $w_2$, in a cascaded fashion with the sum of the lengths of path segment 42 and 44 being the same for the waveguide core arms. The length of path segment 42 in each of the waveguide core arms incrementally varies from the first waveguide core arm to the highest number waveguide core arm. Accordingly the length of path segment 44 increases as the length of path segment 42 decreases. Waveguide core arms 32, 34, 103, 104, and 105 include path segments 46 having a standard waveguide core arms dimension $w_3$. Waveguide core arms 32, 34, 103, 104, and 105 include adiabatic tapers 50 between path segments 46 and path segments 44; adiabatic tapers 49 between path segments 44 and path segments 42; and adiabatic tapers 48 between path segments 42 and path segments 46.

Multiplexer/demultiplexers 120 as shown in FIGS. 4 and 5 are athermalized using principles of the invention as described in relation to the embodiment shown in FIG. 1. The phased array of waveguide core arms in a multiplexer/demultiplexer can be seen as an interferometer with more than two optical paths in the interferometric section, and may have up to about 100 waveguide core arms in the interferometric section. In the multiplexer/demultiplexer the optical path difference (OPD) between two adjacent paths and the center wavelength ($\lambda$) are related by:

$$OPD = N \cdot L = m\lambda;$$

wherein N is the mode field effective index, $-L$ is the path length increase, and m is an integer.

In the embodiment of FIG. 5, the length of path segment 44 plus the length of path segment 42 is l. Path segment 42 has a mode field effective index $N_1$ associated to the waveguide width dimension of $w_1$. Path segment 44 has an a mode field effective index $N_2$ associated to the waveguide width dimension of $w_2$. Path segments 46 have a mode field effective index $N_3$ associated to the waveguide width dimension of $w_3$. The lengths of path segment 42 and 44 are varied depending on the waveguide core arms position in the phased array. When k is the position of the waveguide core arm in the phased array, the length of path segment 42 is given as $l_k(w_1)$ and the length of path segment 44 is given as $l_k(w_2)$ with the sum of these lengths kept constant by:

$$l_k(w_1) + l_k(w_2) = l.$$

The optical path length difference (OPD) between two adjacent waveguide paths can be related by:

$$OPD = N_3 \Delta L + N_1(l_k(w_1) - l_{k-1}(w_1)) + N_2 (l_k(w_2) - l_{k-1}(w_2)) = m\lambda;$$

$$OPD = N_3 \Delta L + (N_2 - N_1)(l_k(w_2) - l_{k-1}(w_2)) = m\lambda.$$

Athermalization ($d\lambda/dT \cong 0$ nm/° C.) may be achieved when the following condition is met:

$$l_k(w_2) - l_{k-1}(w_2) = -(l_k(w_1) - l_{k-1}(w_1)) = \frac{-dN_3/dT}{d(N_2 - N_1)/dT} \Delta L.$$

With $w_1 = 10$ μm, $w_2 = 3$ μm, $dN_3/dT = 10.5 \times 10^{-6}/°$ C. for the silica index temperature dependence, $d(N_2 - N_1)/dT = -2.1 \times 10^{-7}/°$ C., $\Delta L = 80$ μm, the athermalization condition of $$\frac{dN_3}{dT} \Delta L + \frac{d(N_2 - N_1)}{dT} l = 0;$$

is met when $l = 4000$ μm,
with l defined as being $l_k(w2) - l_k(w2) = -(l_k(w1) - l_k(w1))$. Such athermalized multiplexer/demultiplexer may be made more compact by utilizing material compositions that provide a greater difference in thermal index shift slope (nm/° C.) between the core composition and the cladding composition.

It will be apparent to those skilled in the art that various modifications and variations can be made in the structures, designs, compositions, and methods of the present invention without departing from the spirit or scope of the invention. Thus, it is intended that the present invention cover the modifications and variations of the invention provided they come within the scope of the appended claims and their equivalents.

What is claimed is:

1. A method for making an integrated optical waveguide device for use in an environment having a temperature which changes, the method comprising the steps performed either sequentially or non-sequentially of:

providing a planar substrate;

providing a first waveguide arm and a second waveguide arm on the planar substrate, the first waveguide arm and the second waveguide arm each having a length defining a difference in lengths of $\Delta L$, the first waveguide arm and the second waveguide arm each including a core composition having a high index of refraction and a boron concentration $B_{core}$, the first waveguide arm defining a first segment having a length $L_w$ and a waveguide dimension $w_1$, a remainder of the first waveguide arm having a waveguide dimension $w_3$, the second waveguide arm defining a second segment having a length $L_w$ and a waveguide dimension $w_2$, the remainder of the second waveguide arm having a waveguide dimension $w_3$, the first segment and the waveguide dimension $w_1$ having a mode field effective index $N_1$ dependent on the waveguide dimension $w_1$, the second segment and a waveguide dimension $w_2$ having a mode field effective index $N_2$ dependent on the waveguide dimension $w_2$, and the remainder of the first waveguide arms and the remainder of the second waveguide arm having a mode field effective index $N_3$ wherein:

$$\frac{dN_3}{dT}\Delta L + \frac{d(N_2 - N_1)}{dT} L_w \cong O;$$

cladding the first waveguide arm and the second waveguide arm with a cladding composition having a low index of refraction, and a boron concentration $B_{clad}$ different from the boron concentration $B_{core}$ of the core composition so as to define a difference $\Delta B$ between the boron concentration $B_{core}$ of the core composition and the boron composition $B_{clad}$ of the cladding composition; and athermalizing the integrated optical waveguide device by optimizing the difference in lengths $\Delta L$, the length $L_w$, the waveguide dimension $w_1$, the waveguide dimension $w_2$, the waveguide dimension $w_3$, and the difference $\Delta B$ between the boron concentration $B_{core}$ of the core composition and the boron composition $B_{clad}$ of the cladding composition to provide a zero or near-zero thermal spectral shift when the integrated optical waveguide device is subjected to a change in the temperature.

2. An integrated optical waveguide interferometer for use in an environment in which a temperature changes, the integrated optical waveguide interferometer comprising:

a first channel waveguide arm having a first length and a second channel waveguide arm having a second length, the first length and the second length defining a difference in length $\Delta L$, the first channel waveguide arms and the second channel waveguide arm having a core composition, the first channel waveguide arm including a first segment of length $L_w$, a channel waveguide width $w_1$ and a mode field effective index $N_1$ dependent upon the channel waveguide width $w_1$, the first channel waveguide arm including a second segment having a channel waveguide width $w_3$, and a mode field effective index $N_3$ dependent upon the channel waveguide width $w_3$, the second channel waveguide arm having a third segment of length $L_w$, a channel waveguide width $w_2$ and a mode field effective index $N_2$ dependent upon the channel waveguide width $w_2$, the second channel waveguide arm having a fourth segment having a channel waveguide width $w_3$, and a mode field effective index $N_3$ dependent upon the channel waveguide width $w_3$, a waveguide cladding composition, the waveguide cladding composition optically cladding the first channel waveguide arm and the second channel waveguide arm, at least the core composition or the cladding composition or both having a concentration of a dopant for controlling thermal spectral index shift slope (nm/° C.) and defining a difference $\Delta B$ between the concentration of the dopant in the core composition and in the cladding composition, the integrated optical waveguide interferometer being substantially insensitive to a change in the temperature when $$\frac{dN_3}{dT}\Delta L + \frac{d(N_2 - N_1)}{dT} L_w \cong O.$$

3. The integrated optical waveguide interferometer of claim 2 wherein the cladding composition and the core composition include silica glass.

4. The integrated optical waveguide interferometer of claim 2 wherein the dopant for controlling thermal spectral index shift slope (nm/° C.) includes boron.

5. The athermalized integrated optical waveguide device of claim 4 wherein the difference $\Delta B$ in the concentration of the dopant between the core composition and the cladding composition is between about 5 wt. % $B_2O_3$ and about 9 wt. % $B_2O_3$.

6. The athermalized integrated optical waveguide device of claim 4 wherein the difference $\Delta B$ in the concentration of the dopant between the core composition and the cladding composition is between about 6 wt. % $B_2O_3$ and about 8 wt. % $B_2O_3$.

7. The athermalized integrated optical waveguide device of claim 4 wherein the difference $\Delta B$ in the concentration of the dopant between the core composition and the cladding composition is about 7 wt. % $B_2O_3$.

8. The integrated optical waveguide interferometer of claim 2 wherein the concentration of the dopant for controlling thermal spectral index shift slope (nm/° C.) in the either the core composition or the cladding composition or both is not equal to zero.

9. The integrated optical waveguide interferometer of claim 8, wherein the dopant for controlling thermal spectral index shift slope (nm/° C.) includes boron.

* * * * *